United States Patent [19]

Mikami

[11] 4,442,194

[45] Apr. 10, 1984

[54] PREPARATION OF ENCAPSULATED ELECTROSTATOGRAPHIC TONER MATERIAL USING GELATIN DERIVATIVE

[75] Inventor: Takeshi Mikami, Fujinomiya, Japan

[73] Assignee: Fuji Photo Film Co., Ltd., Kanagawa, Japan

[21] Appl. No.: 394,637

[22] Filed: Jul. 1, 1982

[30] Foreign Application Priority Data

Jul. 30, 1981 [JP] Japan ................................ 56-119671

[51] Int. Cl.$^3$ ......................... B01J 13/02; G03G 9/08
[52] U.S. Cl. .................................. 430/137; 430/138; 430/111; 427/220; 264/4.7
[58] Field of Search ....................... 430/138, 137, 111; 252/316; 427/220

[56] References Cited

U.S. PATENT DOCUMENTS 3,516,941  6/1970  Matson ............................ 430/138 X Primary Examiner—John D. Welsh Attorney, Agent, or Firm—Toren, McGeady and Stanger

[57] ABSTRACT

A process for the preparation of an electrostatographic toner material comprising encapsulated toner particles which comprises:

dispersing droplets of hydrophobic liquid having an average particle size in the range from about 0.5 to 1,000 microns and containing pressure fixable adhesive core material including colorant into a hydrophilic colloidal solution containing a gelatin derivative which is selected from the group consisting of a carboxylated gelatin, a sulfonylated gelatin, and an isocyanated gelatin;

encapsulating the droplets with a polymerization reaction product of an active-hydrogen-containing compound with an acid chloride, a bischloroformate, a sulfonyl chloride, an isocyanate and/or an isothiocyanate; and separating the encapsulated droplets from the hydrophilic colloidal solution to obtain the dry toner particles.

6 Claims, No Drawings

PREPARATION OF ENCAPSULATED ELECTROSTATOGRAPHIC TONER MATERIAL USING GELATIN DERIVATIVE

This invention relates to a process for the preparation of an electrostatographic toner material, and more particularly relates to a process for the preparation of a pressure fixable electrostatographic toner material comprising encapsulated toner particles.

There is known the electrostatography which comprises developing a tone electrostatic latent image contained on a photoconductive or dielectric surface with a toner material containing colorant and a fixing aid to produce a visible toner image, and transferring and fixing the visible toner image onto a surface of a support medium such as a sheet of paper.

The development of the latent image to produce a visible toner image is carried out by the use of either a developing agent consisting of a combination of toner material with carrier particles, or a developing agent consisting of toner material only. The developing process utilizing the combination of toner material with carrier particles is named "two component developing process", while the developing process utilizing only the toner material is named "one component developing process".

The toner image formed on the latent image is then transferred onto a surface of a support medium and fixed thereto. The process for fixing the toner image to the support medium can be done through one of three fixing processes, that is, a heat fixing process (fusion process), a solvent fixing process and a pressure fixing process.

The pressure fixing process which involves fixing the toner material onto the surface of a support medium under application of pressure thereto is described, for instance, in U.S. Pat. No. 3,269,626. The pressure fixing process involving the use of neither the heating procedure nor the solvent produces no such troubles as inherently attached to either the heat fixing process or the solvent fixing process. Moreover, the pressure fixing process can be employed with a high speed automatic copying and duplicating process, and the access time is very short in the pressure fixing process. Accordingly, the pressure fixing process is said to be an advantageous fixing process inherently having a variety of preferable features.

However, the pressure fixing process also has a variety of inadvantageous features. For instance, the pressure fixing process generally provides poorer fixability than the heat fixing process does, whereby the toner image fixed onto a paper is apt to rub off easily. Further, the pressure fixing process requires very high pressure for the fixing, and such a high pressure tends to break the cellulose fibers of the support medium such as paper and also produces glossy surface on the support medium. Moreover, the pressing roller requires to have relatively greater size, because the roller necessarily imparts very high pressure to the toner image on the support medium. Accordingly, reduction of the size of a copying and duplicating machine cannot exceed a certain limit defined by the size of the pressing roller.

There has been preveously proposed an encapsulated toner material which comprises toner particles enclosed with micro-capsules, so as to overcome the above-described disadvantageous features of the pressure fixing process. The encapsulated toner material is prepared by enclosing core particles (containing colorant such as carbon black) with shells which are rupturable by the application of pressure. The so-prepared encapsulated toner material has various advantageous features; for instance, the fixing of the encapsulated toner material does not require very high pressure, and the fixability is excellent. Accordingly, the encapsulated toner material is viewed as suitable for the use in the pressure fixing process. However, the encapsulated toner materials proposed up to now appear unsatisfactory in practical use, because they are not able to satisfy all of the characteristics required for providing smooth copying and duplicating operation and for accomplishing excellent toner image fixability and quality.

More in detail, it is required for the toner material for the use as a dry type developing agent in the electrostatography to have excellent powder characteristics (or, powder flow properties) to provide high development quality, and to be free from staining the surface of the photosensitive material on which the latent image is formed. The term "powder characteristics" particularly means resistance to agglomeration and blocking of the toner particles. In the process for the preparation of an encapsulated toner material, the toner material is generally separated from a toner dispersed solution and dried through a spray-drying procedure. The previously known encapsulated toner material is apt to undergo agglomeration either in the spray-drying process, or in the storage period after the spray-drying. The so agglomerated toner material markedly degrades the resolution of the visible toner image produced on the electrostatographic latent image, whereby markedly decreasing the sharpness of the visible toner image fixed onto the support medium.

Further, a toner material employed for the two component developing process is also required not to stain the surfaces of the carrier particles. The toner material for the use as a developing agent in the pressure fixing process is furthermore required to be satisfactory in the fixability under pressure and not to undergo off-setting against the roller surface, that is, phenomenon in which the toner adheres to the roller surface so as to stain it.

The encapsulated toner materials proposed until now are not satisfactory, at least, in one of these requirements for the developing agent to be employed for the pressure fixing process.

It is, accordingly, an object of the invention to provide a process for the preparation of an electrostatographic toner material free from the drawbacks described above.

It is another object of the invention to provide a process for the preparation of an encapsulated toner material suitably employed for the pressure fixing process and free from the drawbacks described above.

It is a further object of the invention to provide a process for the preparation of an encapsulated toner material suitably employed for the pressure fixing process, whose powder characteristics are remarkably improved.

It is a still further object of the invention to provide a process for the preparation of an encapsulated toner material having improved pressure fixability in addition to the improved powder characteristics.

It is a still further object of the invention to provide a process for the preparation of an encapsulated toner material having improved resistance to the off-setting in addition to the improved powder characteristics and the improved pressure fixability.

It is a still further object of the invention to provide a process for the preparation of an encapsulated toner material which is resistant to rupture prior to the pressing operation in the pressure fixing process, while which is readily rupturable in the pressure fixing operation.

The above-described objects and other objects which will be apparent from the hereinafter-given description are accomplished by the present invention, that is, a process for the preparation of an electrostatographic toner material comprising encapsulated toner particles which comprises:

dispersing droplets of hydrophobic liquid having an average particle size in the range from about 0.5 to 1,000 microns and containing pressure fixable adhesive core material including colorant into a hydrophilic colloidal solution containing a gelatin derivative which is selected from the group consisting of a carboxylated gelatin, a sulfonylated gelatin, and isocyanated gelatin;

encapsulating the droplets with a polymerization reaction product of an active-hydrogen-containing compound with an acid chloride, a bischloroformate, a sulfonyl chloride an isocyanate and/or isothiocyanate; and separating the encapsulated droplets from the hydrophilic colloidal solution to obtain the dry toner particles.

The encapsulation of the droplets of the core material with the shell material can be done by any known method for preparing the so-called micro-capsule containing a hydrophobic liquid, such as the phase separation method as described in U.S. Pat. Nos. 2,800,457 and 2,800,458; the interfacial polymerization as described in Japanese Patent Publications No. 38(1963)-19,574, No. 42(1967)-446 and No. 42(1967)-771, British Pat. No. 989,264, No. 950,443, No. 867,797, No. 1,069,140 and No. 1,046,409; the method involving polymerization of a monomer in oil droplets as described in Japanese Patent Publication No. 36(1961)-9,168; the method involving melting, dispersing and cooling procedures as described in British Pat. No. 952,807 and No. 965,074; and the spray-drying method as described in U.S. Pat. No. 3,111,407 and British Pat. No. 930,422.

Among these encapsulating method, the interfacial polymerization method comprising the following process is preferably employed for the preparation of the toner material of the invention.

In the first place, the following two substances are selected:

Substance (A) which as such is a hydrophobic liquid or a substance soluble, miscible or well dispersable in a hydrophobic liquid; and Substance (B) which as such is a hydrophilic liquid or a substance soluble, miscible or well dispersable in a hydrophilic liquid, in which Substance (A) can react with Substance (B) to produce a polymerization reaction product insoluble in either the hydrophobic liquid or the hydrophilic liquid.

In the second place, very small droplets of a hydrophobic liquid including Substance (A) and the core materials such as a colorant and a pressure fixable adhesive material (binder), and having an average diameter in the range from about 0.5 to about 1,000 microns are dispersed into a hydrophilic liquid such as water containing Substance (B).

A catalyst can be incorporated in either or both of the hydrophobic liquid and the hydrophilic liquid.

The Substance (A) is caused to react with Substance (B) to undergo interfacial polymerization in the dispersion by an appropriate procedure, for instance, by heating the dispersion. Thus, the shells of polymerization reaction product of Substance (A) with Substance (B) and/or water are formed around the hydrophobic droplets including the core material and the colorant, and accordingly the encapsulation of the core material and the colorant with the shell is accomplished to produce encapsulated toner particles in the aqueous liquid.

In the present invention, Substance (A) is selected from the group consisting of an acid chloride, a bischloroformate, a sulfonyl chloride, an isocyanate and an isothiocyanate, and Substance (B) is an active-hydrogen-containing compound.

The acid chloride is selected from compounds containing two or more acid chloride groups in the molecular. Examples of the acid chlorides include adipoyl chloride, sebacoyl chloride, phthaloyl chloride, isophthaloyl chloride, terephthaloyl chloride, fumaroyl chloride, 1,4-cyclohexanedicarbonyl chloride, 4,4'-biphenyldicarbonyl chloride, 4,4'-sulfonyldibenzoyl chloride, phosgene, polyesters containing acid chloride groups, and polyamides containing acid chloride groups.

Examples of the bischloroformates include ethylene-bis(chloroformate), tetramethylene-bis(chloroformate), hexamethylene-bis(chloroformate), 2,2'-dimethyl-1,3-propane-bis(chloroformate), and p-phenylene-bis(chloroformate).

The sulfonyl chloride is selected from compounds containing two or more sulfonyl chloride groups in the molecular. Examples of the sulfonyl chlorides include 1,3-benzenedisulfonyl chloride, 1,4-benzenedisulfonyl chloride, 1,5-naphthalenedisulfonyl chloride, 2,7-naphthalenedisulfonyl chloride, 4,4'-biphenyldisulfonyl chloride, p,p'-oxybis(benzenesulfonyl chloride), and 1,6-hexanedisulfonyl chloride.

The isocyanate is selected from compounds containing two or more isocyanate groups in the molecular. Examples of the isocyanates include m-phenylenediisocyanate, p-phenylenediisocyanate, p-phenylenediisocyanate, 2,6-tolylenediisocyanate, 2,4-tolyelendiisocyanate, naphthalene-1,4-diisocyanate, diphenylmethane-4,4'-diisocyanate, diphenylmethane-4,4'-diisocyanate, 3,3'-dimethoxy-4,4'-biphenyldiisocyanate, 3,3'-dimethyldiphenylmethane-4,4'-diisocyanate, xylylene-1,4-diisocyanate, xylylene-1,3-diisocyanate, 4,4'-diphenylpropanediisocyanate, trimethylenediisocyanate, hexamethylenediisocyanate, propylene-1,2-diisocyanate, butylene-1,2-diisocyanate, ethylidynediisocyanate, cyclohexylene-1,2-diisocyanate, cyclohexylene-1,4-diisocyanate, 4,4',4"-triphenylmethanetriisocyanate, toluene-2,4,6-triisocyanate, 4,4'-dimethyldiphenylmethane-2,2',5,5'-tetraisocyanate, hexamethylenediisocyanate-hexanetriol adduct, 2,4-tolylenediisocyanate-catechol adduct, tolylenediisocyanate-trimethylolpropane adduct, and xylylenediisocyanate-trimethylolpropane adduct.

The isothiocyanate is selected from compounds containing two or more isothiocyanate groups in the molecular. Examples of the isothiocyanates include tetramethylenediisothiocyanate, hexamethylenediisothiocyanate, and p-phenylenediisothiocyanate.

Substance (A) can be employed singly or in combination.

The active-hydrogen-containing compound of Substance (B) is selected from compounds containing two or more active hydrogens in the molecular. Examples of the active-hydrogen-containing compounds include water; polyols such as ethylene glycol, 1,4-butanediol, catechol, resorcinol, hydroquinone, 1,2-dihydroxy-4-methylbenzene, 1,3-dihydroxy-5-methylbenzene, 3,4-dihydroxy-1-methylbenzene, 3,5-dihydroxy-1-methylbenzene, 2,4-dihydroxy-1-ethylbenzene, 1,3-naphthalenediol, 1,5-naphthalenediol, 2,3-naphthalenediol, 2,7-naphthalenediol, o,o'-biphenol, p,p'-biphenol, 1,1'-bi-2-naphthol, bisphenol A, 2,2'-bis(4-hydroxyphenyl)-butane, 2,2'-bis-(4-hydroxyphenyl)isopentane, 1,1'-bis(4-hydroxyphenyl)-cyclopentane, 1,1'-bis(4-hydroxyphenyl)cyclohexane, 2,2'-bis(4-hydroxy-3-methylphenyl)propane, bis(2-hydroxyphenyl)methane, xylylenediol, ethylene glycol, 1,3-propylene glycol, 1,4-butylene glycol, 1,5-pentanediol, 1,6-heptanediol, 1,7-heptanediol, 1,8-octanediol, trimethylolpropane, hexanetriol, pentaerythritol, glycerol, and sorbitol; polythiols such as ethylenediamine, tetramethylenediamine, pentamethylenediamine, hexamethylenediamine, p-phenylenediamine, m-phenylenediamine, 2-hydroxytrimethylenediamine, diethylenetriamine, triethylenetetraamine, diethylaminopropylamine, tetraethylenepentaamine, and an addition product of an epoxy compound and an amine compound; and piperazines such as piperazine, 2-methylpiperazine and 2,5-dimethylpiperazine.

In the preparation of the dispersion of the very small hydrophobic droplets containing Substance (A) and the core material, the hydrophobic liquid to be dispersed preferably contains a low-boiling solvent or a polar solvent. These solvents serve for accelerating formation of the shell which is a reaction product between the Substance (A) and the Substance (B). Examples of these solvents include methyl alcohol, ethyl alcohol, diethyl ether, tetrahydrofuran, dioxane, methyl acetate, ethyl acetate, acetone, methyl ethyl ketone, methyl isobutyl ketone, cyclohexanone, n-pentane, n-hexane, benzene, petroleum ether, chloroform, carbon tetrachloride, methylene chloride, ethylene chloride, carbon disulfide and dimethylformamide.

As for the other aspects of the interfacial polymerization method and the other processes for the preparation of micro-capsules containing an oily liquid, there are given descriptions in U.S. Pat. No. 3,726,804, which is introduced hereinto as the reference.

The core material of the invention contains a colorant for producing a visible image from the latent image. The colorant generally is a dye or a pigment, but a certain agent providing no directly visible image such as a fluorescent substance can be employed as the colorant, if desired.

The colorant is generally selected from a variety of the dye, pigment and the like employed generally in the conventional electrostatographic copying and duplicating process. Generally the colorant is a black toner or a chromatic toner. Examples of the black toners include carbon black. Examples of the chromatic toners include blue colorants such as copper phthalocyanine and a sulfonamide derivative dye; yellow colorants such as a benzidine derivative colorant, that is generally called Diazo Yellow; and red colorants such as Rhodamine B Lake that is a double salt of xanthin dye with phosphorus wolframate and molybdate, Carmine 6B belonging to Azo pigment, and a quinacridone derivative.

The core material of the invention further contains a binder for keeping the colorant within the core and assisting the fixing of the colorant onto the surface of a support medium such as paper. The binder is generally selected from high-boiling liquids conventionally employed or proposed for employment for finely dispersing an oil-soluble photographic additive within an aqueous medium to incorporate the additive into a silver halide color photosensitive material, and/or selected from polymers proposed for employment as the binders for the pressure fixable encapsulated toner materials.

Examples of the high-boiling liquids include the following compound having the boiling point of higher than 180° C.:

(1) Phthalic esters
dibutyl phthalate, dihexyl phthalate, diheptyl phthalate, dioctyl phthalate, dinonyl phthalate, dodecyl phthalate, butyl phthalyl butyl glycolate, dibutyl monofluorophthalate;

(2) Phosphoric acid esters
tricresyl phosphate, trixylenyl phosphate, tris(isopropylphenyl) phosphate, tributyl phosphate, trihexyl phosphate, trioctyl phosphate, trinonyl phosphate, tridecyl phosphate, trioleyl phosphate, tris-(butoxyethyl) phosphate, tri(chloroethyl) phosphate, tris(dichloropropyl) phosphate;

(3) Citric acid esters
O-acetyl triethyl citrate, O-acetyl tributyl citrate, O-acetyl trihexyl citrate, O-acetyl trioctyl citrate, O-acetyl trinonyl citrate, O-acetyl tridecyl citrate, triethyl citrate, tributyl citrate, trihexyl citrate, trioctyl citrate, trinonyl citrate, tridecyl citrate;

(4) Benzoic acid esters
butyl benzoate, hexyl benzoate, heptyl benzoate, octyl benzoate, nonyl benzoate, decyl benzoate, dodecyl benzoate, tridecyl benzoate, tetradecyl benzoate, hexadecyl benzoate, octadecyl benzoate, oleyl benzoate, pentyl o-methylbenzoate, decyl p-methylbenzoate, octyl o-chlorobenzoate, lauryl p-chlorobenzoate, propyl 2,4-dichlorobenzoate, octyl 2,4-dichlorobenzoate, stearyl 2,4-dichlorobenzoate, oleyl 2,4-dichlorbenzoate, octyl p-methoxybenzoate;

(5) Aliphatic acid esters
hexadecyl myristate, dibutoxyethyl succinate, dioctyl adipate, dioctyl azelate, decamethylene-1,10-diol diacetate, triacetin, tributin, benzyl caprate, pentaerythritol tetracaproate, isosorbitol dicaprilate;

(6) Alkylnaphthalenes
methylnaphthalene, dimethylnaphthalene, trimethylnaphthalene, tetramethylnaphthalene, ethylnaphthalene, diethylnaphthalene, triethylnaphthalene, monoisopropylnaphthalene, diisopropylnaphthalene, tetraisopropylnaphthalene, monomethylethylnaphthalene, isooctylnaphthalene;

(7) Dialkylphenyl ethers
di-o-methylphenyl ether, di-m-methyldiphenyl ether, di-p-methylphenyl ether;

(8) Amides of fatty acids and aromatic sulfonic acid
N,N-dimethyllauroamide, N,N-diethylcaprylamide, N-butylbenzenesulfonamide;

(9) Trimellitic acid esters
trioctyl trimellitate;

(10) Diarylalkanes
diarylmethanes, e.g., dimethylphenylphenylmethane, diarylethanes, e.g., 1-methylphenol-1-phenylethane, 1-dimethylphenyl-1-phenylethane, 1-ethylphenyl-1-phenylethane.

The above-listed high-boiling liquids and examples of other high-boiling liquids employable in the invention are described in detail in the following publications:

Japanese Patent Publications No. 46(1971)-23,233 and No. 49(1974)-29,461; Japanese Patent Provisional Publications No. 47(1972)-1,031, No. 50(1975)-62,632, No. 50(1975)-82,078, No. 51(1976)-26,035, No. 51(1976)-26,036, No. 51(1976)-26,037, No. 51(1976)-27,921, and No. 51(1976)-27,922; U.S. Pat. Nos. 2,322,027, 2,353,262, 2,533,514, 2,835,579, 2,852,383, 3,287,134, 3,554,755, 3,676,137, 3,676,142, 3,700,454, 3,748,141, 3,837,863, and 3,936,303; British Pat. No. 958,441, No. 1,222,753, No. 1,346,364, and No. 1,389,674; and West Germany Offenlegungsschrift No. 2,538,889.

For the purpose of the invention, the high-boiling liquid is preferably selected from the phthalic acid esters, phosphoric acid esters and alkylnaphthalenes.

Examples of the polymers include the following polymers:

polyolefins, olefin copolymers, polystyrene, styrene-butadiene copolymer, epoxy resins, polyesters, natural and synthetic rubbers, polyvinylpirolidone, polyamides, cumarone-indene copolymer, methyl vinyl ethermaleic anhydride copolymer, maleic acid-modified phenol resin, phenol-modified terpene resin, silicone resins, epoxy-modified phenol resin, amino resins, polyurethane elastomers, polyurea elastomers, homopolymers and copolymers of acrylic acid ester, homopolymers and copolymers of methacrylic acid ester, acrylic acid-long chain alkyl methacrylate copolymer oligomer, poly(vinyl acetate), and poly(vinyl chloride).

The above-listed polymers and examples of other polymers employable in the invention are described in detail in the following publications.

Japanese Patent Publications No. 48(1973)-30,499, No. 49(1974)-1,588 and No. 54(1979)-8,104; Japanese Patent Provisional Publications No. 48(1973)-75,032, No. 48(1973)-78,931, No. 49(1974)-17,739, No. 51(1976)-132,838, No. 52(1977)-98,531, No. 52(1977)-108,134, No. 52(1977)-119,937, No. 53(1978)-1,028, No. 53(1978)-36,243, No. 53(1978)-118,049, No. 55(1980)-89,854 and No. 55(1980)-166,655; and U.S. Pat. Nos. 3,788,994 and 3,893,933.

The core material can further contain other agents such as a releasing agent and magnetizable particles.

The releasing agent serves for keeping the ruptured shell and the released core material from adhering to the surface of the pressing roller. The releasing agent can be chosen from these proposed for employment in the previously reported encapsulated toners. Examples of the releasing agents include a fluorine-containing resin described in Japanese Patent Provisional Publications No. 55(1980)-142,360 and No. 55(1980)-142,362.

The magnetizable particles are included in the core material where a magnetizable toner material for the one component developing process is desired. As for the magnetizable particles, there are descriptions, for instance, in Japanese Patent Provisional Publications No. 53(1978)-118,053, No. 53(1978)-1,028 and No. 55(1980)-166,655. Examples of materials of the magnetizable particles preferably employed in the invention include metals such as cobalt, iron and nickel; metal alloys or metal compositions comprising aluminum, cobalt, copper, iron, lead, magnesium, nickel, tin, zinc, gold, silver, antimony, beryllium, bismuth, cadmium, calcium manganese, titanium, tungsten, vanadium and/or zirconium; metallic compounds including metal oxides such as aluminium oxide, ferric oxide, cupric oxide, nickel oxide, zinc oxide, zirconium oxide, titanium oxide and magnesium oxide; refractory metal nitrides such as chromium nitride; metal carbides such as tungsten carbide and silica carbide; ferro-magnetic ferrite; and their mixtures.

As mentioned hereinbefore, the process for the preparation of the encapsulated toner particles includes a stage for dispersing (or emulsifying) very small droplets of the hydrophobic liquid containing Substance (A) and the core material into a hydrophilic colloidal solution containing a specific gelatin derivative. A simple gelatin or other gelatin derivatives which are conventionally used for preparing such a dispersion sometimes produce geled dispersion to interfere with the formation of well-qualified shell. The gelatin derivative specified in the invention, in contrast, can effectively assist the production of homogeneous dispersion (or, emulsion) of the hydrophobic droplets and effectively prevent agglomeration of the so-produced hydrophobic droplets.

The gelatin derivative employed in the invention is selected from the group consisting of a carboxylated gelatin, a sulfonylated gelatin, and an isocyanated gelatin. These gelatin derivatives can be prepared by reaction of gelatin with an acid anhydride, an isocyanate and/or an active-halogen-containing compound.

Examples of the acid anhydrides include maleic anhydride, phthalic anhydride, benzoic anhydride, acetic anhydride, isatic anhydride, and succinic anhydride.

Examples of the isocyanates include phenyl isocyanate, p-bromophenyl isocyanate, p-chlorophenyl isocyanate, p-tolyl isocyanate, p-nitrophenyl isocyanate, and naphthyl isocyanate.

Examples of the active-halogen-containing compounds include benzenesulfonyl chloride, p-methoxybenzenesulfonyl chloride, p-phenoxybenzenesulfonyl chloride, p-bromobenzenesulfonyl chloride, p-toluenesulfonyl chloride, m-nitrobenzenesulfonyl chloride, m-sulfobenzoyl dichloride, naphthalene-$\beta$-sulfonyl chloride, p-chlorobenzenesulfonyl chloride, 3-nitro-4-aminobenzenesulfonyl chloride, 2-carboxy-4-bromobenzenesulfonyl chloride, m-carboxybenzenesulfonyl chloride, 2-amino-5-methylbenzenesulfonyl chloride, phthalyl chloride, p-nitrobenzoyl chloride, benzoyl chloride, ethyl chlorocarbonate, and furoyl chloride.

Details of the preparation of these gelatin derivatives are described in U.S. Pat. No. 2,614,928.

Further, an emulsifying surface active agent can be employed in conjunction with the gelatin derivative to prepare the homogeneous dispersion (or, emulsion) or the very small droplets of the hydrophobic liquid.

Examples of the surface active agents include nonionic surface active agents, for instance, saponin(steroide type), alkylene oxide derivatives such as polyethylene glycol, polyethylene glycol/polypropylene glycol condensation product, alkyl- or alkylarylether or polyethylene glycol, polyethylene glycol esters, polyethylene glycol sorbitol ester, alkylamine or amide of polyalkylene glycol, polyethylene oxide adduct of silicone polymer, glycidol derivatives such as polyglyceride alkenylsuccinate and alkylphenol polyglyceride, fatty acid esters of polyhydric alcohols, alkylesters of saccharide, urethanes and ethers; and anionic surface active agents having acidic groups such as carboxy, sulfo, phospho, sulfate ester and phosphate ester groups, for instance, triterpenoide-type saponin, alkylcarboxylic acid salts, alkylsulfonic acid salts, alkylbenzenesulfonic acid salt, alkylnaphthalenesulfonic salts, alkylsulfate esters, alkylphosphate esters, N-acyl-N-alkyl-taurines, sulfosuccinic acid esters, sulfoalkyl-polyoxyethylene alkyl phenyl ethers, and polyoxyethylene alkylphosphate esters.

Particularly preferred surface active agents are anionic surface active agents belonging to the sulfonic acid type and the sulfate ester type, namely, compounds having in the molecular structure both of hydrophobic groups containing 8–30 carbon atoms and hydrophilic groups of $-SO_3M$ or $-OSO_3M$ (in which M is Na or K). These preferred anionic surface active agents belonging to the above-mentioned types are described in detail in "Surface Active Agents" (A. W. Perry; Interscience Publication Inc., New York).

Representative examples of the preferred anionic surface active agents are as follows: sodium dodecylsulfate, sodium tetradecylsulfate, Turkey red oil, sodium dodecylcarboxyamidoethylsulfate, sodium dodecylsulfonate, sodium tetradecylsulfonate, sodium polyoxyethylene-octylphenyl-ethersulfonate, sodium salt of sulfosuccinic acid dioctylester, sodium dodecylbenzenesulfonate, sodium tetradecylamidophenylsulfonate, and sodium tri-isopropylnaphthalenesulfonate.

Dispersing or emulsifying the reaction liquid can be carried out by means of a known homogenizer such as one belonging to the stirring type, the high pressure injecting type, the ultrasonic vibrating type and the kneader type. Particularly preferred homogenizers are a colloid mill, a conventional homogenizer, and electromagnetic distortion inducing ultrasonic homogenizer.

The encapsulated toner is then produced, for instance, by heating the emulsified reaction liquid in the presence of an appropriate catalyst, as described hereinbefore, so as to form shells around the core material droplets. Subsequently, the encapsulated toner is separated from the aqueous reaction medium and dried to obtain a dry encapsulated toner. The encapsulated toner is preferably washed with water after the separation from the aqueous reaction medium and prior to the drying procedure. The drying procedure can be carried out by a known process such as the spray-drying process or the freeze-drying process. The spray-drying process is preferred.

The so-produced dry encapsulated toner can be admixed with an insulating material and/or a charge controller such as a metal-containing dye or Nigrosine dye.

The dry encapsulated toner can be admixed with a flow lubricant such as hydrophobic silica powder so that the flow lubricant can be dispersed over the surface of the encapsulated toner. The encapsulated toner having the flow lubricant such as hydrophobic silica powder over the toner surface shows particularly improved powder quality and property, and accordingly is very advantageous in the practical use.

The encapsulated toner obtained as above can be introduced into the electrostatographic copying and duplicating machine to develop an electrostatographically produced latent image so as to produce a visible toner image on the surface of the photoconductive material. The visible image is then fixed onto a support medium such as paper by means of an appropriate pressure fixing apparatus. There is no limitation on the pressure fixing apparatus for fixing the encapsulated toner of the invention, and any known apparatus can be applied to the fixing of the encapsulated toner of the invention. Examples of the pressure fixing apparatuses include those illustrated in Japanese Patent Publications No. 44(1969)-9,880, No. 44(1969)-12,797, and No. 46(1971)-15,876; and Japanese Patent Provisional Publications No. 49(1974)-62,143, No. 49(1974)-77,641, No. 50(1975)-51,333, No. 51(1976)-31,235, No. 51(1976)-40,351, No. 52(1977)-15,335, No. 52(1977)-102,743, No. 54(1979)-28,636, No. 54(1979)-32,326, No. 54(1979)-41,444, and No. 54(1979)-48,251.

The electrostatographic toner material comprising the encapsulated toner particles prepared by the process of the invention has improved powder characteristics, and is resistant to the mechanical shock and abrasion in the developing apparatus of the electrostatographic copying and duplicating machine. Further, the electrostatographic toner material of the invention is easily rupturable in the pressure fixing apparatus to produce a visible toner image well fixed onto the support medium such as paper. Furthermore, the toner material of the invention hardly undergoes off-setting to a pressing roller and hardly undergoes the so-called filing on the surfaces of the carrier particles, the developing sleeves and the photoconductive material.

In the employment for the two component developing process, the toner material of the invention can be appropriately charged to carry an electron charge in the range of 10–20 $\mu c/g$ (plus or minus) in combination with an adequate carrier or with an adequate charge controller, so as to provide a visible image fixed on a support medium with high quality such as high resolution and high sharpness with substantially no fog. The development characteristics and the pressure fixability of the toner material of the invention are kept at an excellent level even after copying and duplicating procedure is repeated to a certain extent.

Even in the employment for the one compoent developing process, the toner material of the invention is well qualified in the developing characteristics, the pressure fixing characteristics and the resistance to the off-setting. Moreover, no filming is produced on the surfaces of the development sleeve and the photosensitive material.

Other features of the electrostatographic copying and duplicating process employing an encapsulated toner material are described in U.S. Pat. No. 3,788,994, which is introduced hereinto as the reference.

The present invention will be illustrated by the following examples which are by no means intended to introduce any restriction into the invention.

EXAMPLE 1

Into a dispersion of 3 g. of carbon black in 27 g. of dibutyl phthalate was introduced 10 g. of a mixture of acetone and methylene chloride (1:3, volume ratio), and the mixture was then admixed to become homogeneous.—Primary liquid.

Subsequently, 4 g. of an adduct of hexamethylene diisocyanate with hexanetriol (3:1 molar ratio adduct) and 0.05 g. of dibutyltin laurate (catalyst) were added to the primary liquid at room temperature.—Secondary liquid.

Independently, 2 g. of phthalated gelatin was dissolved in 57 g. of water at 20° C., and into this solution under vigorous stirring was poured little by little the secondary liquid. Thus, there was obtained an oil-in-water emulsion containing oily droplets having average diameter of 10–15$\mu$. The procedure for the preparation of the emulsion was carried out under cooling the reaction vessel for keeping the temperature of the emulsion below 20° C.

To the emulsion was further added under stirring 100 g. of water heated to 40° C. After completion of the addition of water, the emulsion was gradually heated to 90° C. over 30 min. The emulsion was kept under stirring at the temperature for 20 min. so as to complete the encapsulating reaction.

Then, the dispersion containing the encapsulated oily particles was kept under stirring at 40° C. for 1 hour after adding 2 g. of promnase P (gelatin decomposition enzyme) to decompose the phthalated gelatin.

The so prepared dispersion was subjected to centrifugal separation at 5,000 r.p.m. to separate the encapsulated particles from the aqueous enzymatically decomposed phthalated gelatin solution. The so separated encapsulated particles were again dispersed in 100 ml. of water, and the dispersion was dried in a spray-drying apparatus to obtain a powdery encapsulated toner material.

The encapsulated toner material obtained above was composed of a core containing the carbon black and dibutyl phthalate and a shell made substantially of a reaction product of the adduct of hexamethylene diisocyanate with hexanetriol and water. Microscopic observation of the encapsulated toner indicated that most of the toner particles were present independently and that no bulky agglomerated particles were formed.

The evaluation of the encapsulated toner was carried out as follows.

The encapsulated toner was well admixed with 0.5% by weight of hydrophobic silica fine powder to place the silica powder on the surface of the toner. Five parts by weight of the so treated toner were admixed with 95 parts by weight of powdery iron carrier in a shaking apparatus to prepare a developing agent. It was confirmed through microscopic observation that the developing agent contained no ruptured toner particles.

A conventional electrostatographic copying and duplicating process was carried out using the above developing agent. The visible toner image produced on a latent image was then converted onto a paper. The paper carrying the toner image was treated under a pressing roller at a pressure of 350 kg/cm$^2$. There was obtained a toner image with high sharpness and well fixed onto the paper. Further, the off-setting of the toner was at a very low level.

COMPARISON EXAMPLE 1

An encapsulated toner material was prepared using the same core material as described in Example 1 and using a gelatin shell. The encapsulation with the gelatin shell was carried out by the phase separation method as described in U.S. Pat. Nos. 2,900,457 and 2,800,458.

Microscopic observation indicated that not a few toner particles encapsulated with gelatin agglomerated producing relatively bulky particles.

EXAMPLE 2

In a dispersion of 1 g. of carbon black in 13 cc. of tricresyl phosphate was dissolved 1 g. of an adduct of tolylene diisocyanate with hexanetriol (3:1 molar ratio adduct) to prepare a primary liquid.

Independently, 3 g. of phenylcarbamylated gelatin was dissolved in 100 cc. of water to prepare a secondary liquid.

The primary liquid was dropped into the secondary liquid under stirring to disperse very small droplets of the primary oily liquid in the secondary liquid. The mixture was further emulsified under stirring at room temperature for approximately 2 hours followed by stirring at 80° C. for approximately 1 hour. While the stirring was carried out, the diisocyanate adduct reacted with water to produce insoluble shells enclosing the oily droplets to yield encapsulated toner particles.

The dispersion containing the encapsulated oily particles was then treated in the same manner as described in Example 1 to obtain a powdery encapsulated toner material.

The encapsulated toner material obtained above was composed of a core containing the carbon black and tricresyl phosphate and a shell made substantially of a reaction product of the adduct of tolylene diisocyanate with hexanetriol and water. Microscopic observation of the encapsulated toner indicated that most of the toner particles were present independently and that no bulky agglomerated particles were formed.

The evaluation of the encapsulated toner as the developing agent was carried out in the same manner as described in Example 1. It was confirmed that substantially no ruptured toner particles were seen upon mixing with the powdery iron carrier. Also confirmed was that a toner image with sharpness was well fixed onto a paper. The off-setting of the toner was kept at a very low level.

EXAMPLE 3

A solution of 4 g. of polythiol-type polysulfide resin (Thiokol LP-2, trade mark of Thiokol Corporation) in 10 g. of methylene chloride was mixed with a dispersion consisting of 15 g. of magnetite powder, 1 g. of carbon black, and 14 g. of dibutyl phthalate to prepare a primary liquid. To the primary liquid were added 6 g. of diphenylmethane-4,4'-diisocyanate and 0.05 g. of N,N-dimethylbenzylamine (catalyst) to prepare a secondary liquid.

Into a solution of 0.6 g. of phthalated gelatin and 0.5 g. of Turkey red oil in 20 g. of water at 15° C. under vigorous stirring was poured little by little the secondary liquid. Thus, there was obtained an oil-in-water type emulsion containing oily droplets having average diameter of 10–15$\mu$. The procedure for the preparation of the emulsion was carried out under cooling the reaction vessel for keeping the temperature of the emulsion below 15° C.

To the emulsion was further added under stirring 100 g. of water heated to 60° C. After completion of the addition of water, the emulsion was gradually heated to 95° C. over 30 min. The emulsion was then kept under stirring at the temperature for 60 min. so as to complete the encapsulating reaction.

The dispersion containing the encapsulated oily particles was then treated in the same manner as described in Example 1 to obtain a powdery encapsulated toner material.

The encapsulated toner material obtained above was composed of a core containing the carbon black and dibutyl phthalate and a shell made substantially of a reaction product of diphenylmethane-4,4'-diisocyanate with the polysulfide resin and water. Microscopic observation of the encapsulated toner indicated that most of the toner particles were present independently and that no bulky agglomerated particles were formed.

The evaluation of the encapsulated toner as the developing agent was carried out in a conventional manner for the one-component-system development and substantially no ruptured toner particles were seen upon mixing with the powdery iron carrier. It was confirmed that a toner image with sharpness was well fixed onto a paper. The off-setting of the toner was kept at a very low level.

EXAMPLE 4

In a dispersion of 1.5 g. of carbon black in 15 cc. of triethyl citrate was dissolved 1 g. of an adduct of tolylene diisocyanate with hexanetriol (3:1 molar ratio adduct) to prepare a primary liquid.

Independently, 1.5 g. of aqueous hexamethylenediamine solution (10%) was added to a solution of 3 g. of phthalated gelatin in 100 cc. of water to prepare a secondary liquid.

The primary liquid was dropped into the secondary liquid under stirring to disperse very small droplets of the primary oily liquid in the secondary liquid. The dispersion was further emulsified under stirring at room temperature for approximately 2 hours followed by stirring at 75° C. for approximately 1 hour. While the stirring was carried out, the diisocyanate adduct reacted with hexamethylenediamine to produce insoluble shells enclosing the oily droplets to yield encapsulated toner particles.

The dispersion containing the encapsulated oily particles was then treated in the same manner as described in Example 1 to obtain a powdery encapsulated toner material.

The encapsulated toner material obtained above was composed of a core containing the carbon black and triethyl citrate and a shell made substantially of a reaction product of the adduct of tolylene diisocyanate with hexanetriol and hexamethylenediamine. Microscopic observation of the encapsulated toner indicated that most of the toner particles were present independently and that no bulky agglomerated particles were formed.

The evaluation of the encapsulated toner as the developing agent was carried out in the same manner as described in Example 1. It was confirmed that substantially no ruptured toner particles were seen upon mixing with the powdery iron carrier. Also confirmed was that a toner image with sharpness was well fixed onto a paper. The off-setting of the toner was kept at a very low level.

I claim:

1. A process for the preparation of an electrostatographic toner material comprising encapsulated toner particles which comprises:
   dispersing droplets of hydrophobic liquid having an average particle size in the range from about 0.5 to 1,000 microns and containing pressure fixable adhesive core material including colorant into a hydrophilic colloidal solution containing a gelatin derivative which is selected from the group consisting of a carboxylated gelatin, a sulfonylated gelatin, and an isocyanated gelatin;
   encapsulating the droplets with a polymerization reaction product of an active-hydrogen-containing compound with an acid chloride, a bischloroformate, a sulfonyl chloride, an isocyanate or an isothiocyanate; and
   separating the encapsulated droplets from the hydrophilic colloidal solution to obtain the dry toner particles.

2. The process for the preparation of an electrostatographic toner material as claimed in claim 1, in which the gelatin derivative is a carboxylated gelatin.

3. The process for the preparation of an electrostatographic toner material as claimed in claim 2, in which the carboxylated gelatin is a reaction product of gelatin with an aromatic carboxylic acid anhydride or an aromatic carboxylic acid chloride.

4. The process for the preparation of an electrostatographic toner material as claimed in claim 1, in which the polymerization reaction product for encapsulating the droplets is a polymerization reaction product of an active-hydrogen-containing compound with an isocyanate.

5. The process for the preparation of an electrostatographic toner material as claimed in claim 4, in which the active-hydrogen-containing compound is a polyol or a polyamine.

6. The process for the preparation of an electrostatographic toner material as claimed in claim 4, in which the active-hydrogen-containing compound is an alkylene diamine or an alkylene diol in which the alkylene group contains 2–8 carbon atoms.

* * * * *